United States Patent
Stauffer et al.

(10) Patent No.: US 10,779,348 B2
(45) Date of Patent: Sep. 15, 2020

(54) CELLULAR-WIRELESS LOCAL AREA NETWORK (WLAN) NETWORK INTERFACE

(71) Applicant: Google LLC, Mountain View, CA (US)

(72) Inventors: Erik Richard Stauffer, Sunnyvale, CA (US); Jibing Wang, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/998,794

(22) Filed: Aug. 16, 2018

(65) Prior Publication Data

US 2020/0059983 A1 Feb. 20, 2020

(51) Int. Cl.
| | |
|---|---|
| *H04W 76/16* | (2018.01) |
| *H04W 76/12* | (2018.01) |
| *H04W 88/16* | (2009.01) |
| *H04W 92/06* | (2009.01) |
| *H04W 8/02* | (2009.01) |
| *H04W 84/12* | (2009.01) |

(52) U.S. Cl.
CPC .......... *H04W 76/16* (2018.02); *H04W 76/12* (2018.02); *H04W 88/16* (2013.01); *H04W 92/06* (2013.01); *H04W 8/02* (2013.01); *H04W 84/12* (2013.01)

(58) Field of Classification Search
CPC ......... H04W 4/02; H04W 4/029; H04W 4/04; H04W 4/043; H04W 4/046; H04W 8/02; H04W 76/12; H04W 76/16; H04W 88/12; H04W 88/16; H04W 92/04; H04W 92/045; H04W 92/06
See application file for complete search history.

(56) References Cited

U.S. PATENT DOCUMENTS

| | | | |
|---|---|---|---|
| 2016/0373964 A1 | 12/2016 | Nagasaka et al. | |
| 2017/0055313 A1 | 2/2017 | Sharma et al. | |
| 2018/0227828 A1* | 8/2018 | Sirotkin | H04W 52/02 |
| 2019/0230475 A1* | 7/2019 | Edge | H04W 4/029 |

FOREIGN PATENT DOCUMENTS

| | | |
|---|---|---|
| EP | 2824870 | 1/2015 |
| EP | 2840815 | 2/2015 |
| WO | 2014066833 | 5/2014 |

OTHER PUBLICATIONS

"International Search Report and Written Opinion", PCT Application No. PCT/US2019/045351, dated Oct. 15, 2019, 15 pages.

* cited by examiner

*Primary Examiner* — Pao Sinkantarakorn (74) *Attorney, Agent, or Firm* — Colby Nipper PLLC (57) ABSTRACT

This document describes improvements in mobility for user equipment (UE) (110) between cellular and Wireless Local Area Networks (WLAN) (170) in fifth generation new radio (5G NR) wireless networks, as well as 3rd Generation Partnership Project Long-Term Evolution (3GPP LTE) or Evolved Universal Terrestrial Radio Access (E-UTRA) networks. A cellular-WLAN network interface is introduced to monitor and manage WLAN networks (170) and Access Points (160), and to facilitate handoffs of UE (110) between WLAN APs (160), between WLAN networks (170), and between WLAN networks (170) and cellular networks (140). The cellular-WLAN network interface enables an Access and Mobility Function (220) in a 5G network or a Mobility Management Entity (330) in an E-UTRA network to request information from UE (110) and WLAN APs (160), manage the operating configuration of WLAN APs (160), and initiate UE (110) handoffs.

19 Claims, 8 Drawing Sheets

CELLULAR-WIRELESS LOCAL AREA NETWORK (WLAN) NETWORK INTERFACE

BACKGROUND

The evolution of wireless communication to fifth generation (5G) standards and technologies provides higher data rates and greater capacity with improved reliability and lower latency, which enhances mobile broadband services. 5G technologies also provide new classes of service for vehicular networking, fixed wireless broadband, and the Internet of Things (IoT).

For a class of service, such as enhanced mobile broadband, 5G networks provide higher data rates than conventional cellular systems. However, it is still desirable to use WLAN networks for mobile broadband in various settings, such as a home or office, or to reduce power consumption in mobile devices.

Offloading data traffic from a cellular network to a Wireless Local Area Network (WLAN) and handing over network connections from cellular to WLAN (e.g., Wi-Fi) reduces the cost of data transmission for end users and network operators. However, conventional techniques for interoperability between cellular and WLANs lack core network interfaces (reference points), gateways, and management interfaces to cohesively manage cellular and WLAN infrastructure, which results in challenges with handovers, dropped data traffic and context, unreliable WLAN Access Points (APs), varying levels of service quality, or the like.

SUMMARY

This summary is provided to introduce simplified concepts of a cellular-WLAN network interface. The simplified concepts are further described below in the Detailed Description. This summary is not intended to identify essential features of the claimed subject matter nor is it intended for use in determining the scope of the claimed subject matter.

In some aspects, a method to monitor and manage a wireless local area network (WLAN) access point (AP) in a WLAN network by a WLAN gateway of a cellular network is described. [SYC: See my comments in claims section.] The gateway receives a control-plane request from a core network function to report one or more parameters of the WLAN AP to the core network function and forwards the control-plane request to the WLAN AP that causes the WLAN AP to respond to the request. The gateway receives a response to the control-plane request from the WLAN AP and forwards the response from the WLAN AP to the core network function.

In some aspects, a method to monitor and manage a wireless local area network (WLAN) access point (AP) in a WLAN network by a WLAN gateway of a cellular network is described. The WLAN gateway receives a control-plane request from a core network function to report one or more parameters of the WLAN AP to the core network function and forwards the control-plane request to the WLAN AP that causes the WLAN AP to respond to the request. The WLAN gateway receives a response to the control-plane request from the WLAN AP and forwards the response from the WLAN AP to the core network function.

In other aspects, a WLAN gateway device is described that includes a core network interface and a processor and memory system to implement a WLAN gateway manager application. The WLAN gateway manager application is configured to receive a control-plane request from a core network function to report one or more parameters of the WLAN AP to the core network function, forward the control-plane request to the WLAN AP, which causes the WLAN AP to respond to the request, receive a response to the control-plane request from the WLAN AP, and forward the response from the WLAN AP to the core network function.

In further aspects, a system is described that includes a wireless local area network (WLAN) access gateway and a mobility management function connected to the WLAN access gateway by a first interface. The WLAN access gateway configured to receive, from the mobility management function and via the first interface, a control-plane request to report one or more parameters of a WLAN access point (AP) in a WLAN network and forward the control-plane request to the WLAN AP that is effective to cause the WLAN AP to respond to the request. The WLAN access gateway configured to receive a response to the control-plane request from the WLAN AP and forward, to the mobility management function and via the first interface, the response from the WLAN AP.

BRIEF DESCRIPTION OF THE DRAWINGS

Aspects of a cellular-WLAN network interface are described with reference to the following drawings. The same numbers are used throughout the drawings to reference like features and components.

DETAILED DESCRIPTION

Overview

This document describes improvements in mobility for user equipment (UE) between cellular and Wireless Local Area Networks (WLAN) in fifth generation new radio (5G NR) wireless networks, as well as 3rd Generation Partnership Project Long-Term Evolution (3GPP LTE) or Evolved Universal Terrestrial Radio Access (E-UTRA) networks. A cellular-WLAN network interface is introduced to monitor and manage WLAN networks and Access Points (APs), and to facilitate handoffs of UE between WLAN APs, between WLAN networks, and between WLAN networks and cellular networks. The cellular-WLAN network interface enables an Access and Mobility Management Function (AMF) in a 5G network or a Mobility Management Entity (MME) in an E-UTRA network to request information from UE and WLAN APs, manage the operating configuration of WLAN APs, and initiate UE handoffs.

The techniques described provide interfaces, requests, commands, and procedures to connect WLAN Access Points (APs) and user equipment (UE) to the AMF or MME of a cellular network. These techniques serve to better integrate the operation and management of WLAN networks with cellular networks. By integrating the management of cellular network resources and WLAN network resources, improvements in network utilization, network capacity, interference mitigation, handoff reliability, or the like are provided.

The AMF or MME uses the requests implemented by the cellular-WLAN network interface to receive configurations of operating parameters from the UE and/or WLAN APs. The AMF or MME can also request measurement from the UE and/or WLAN APs of serving or neighbor WLAN APs. By integrating the management and measurement of the WLAN and cellular networks, mobility management techniques from the cellular network are extended to WLAN networks to improve user-plane data throughput and reliability.

While features and concepts of the described methods, devices, systems, and means for a cellular-WLAN network interface can be implemented in any number of different environments, systems, devices, and/or various configurations, aspects of the cellular-WLAN network interface are described in the context of the following example devices, systems, and configurations.

Example Environment

Figure 1:
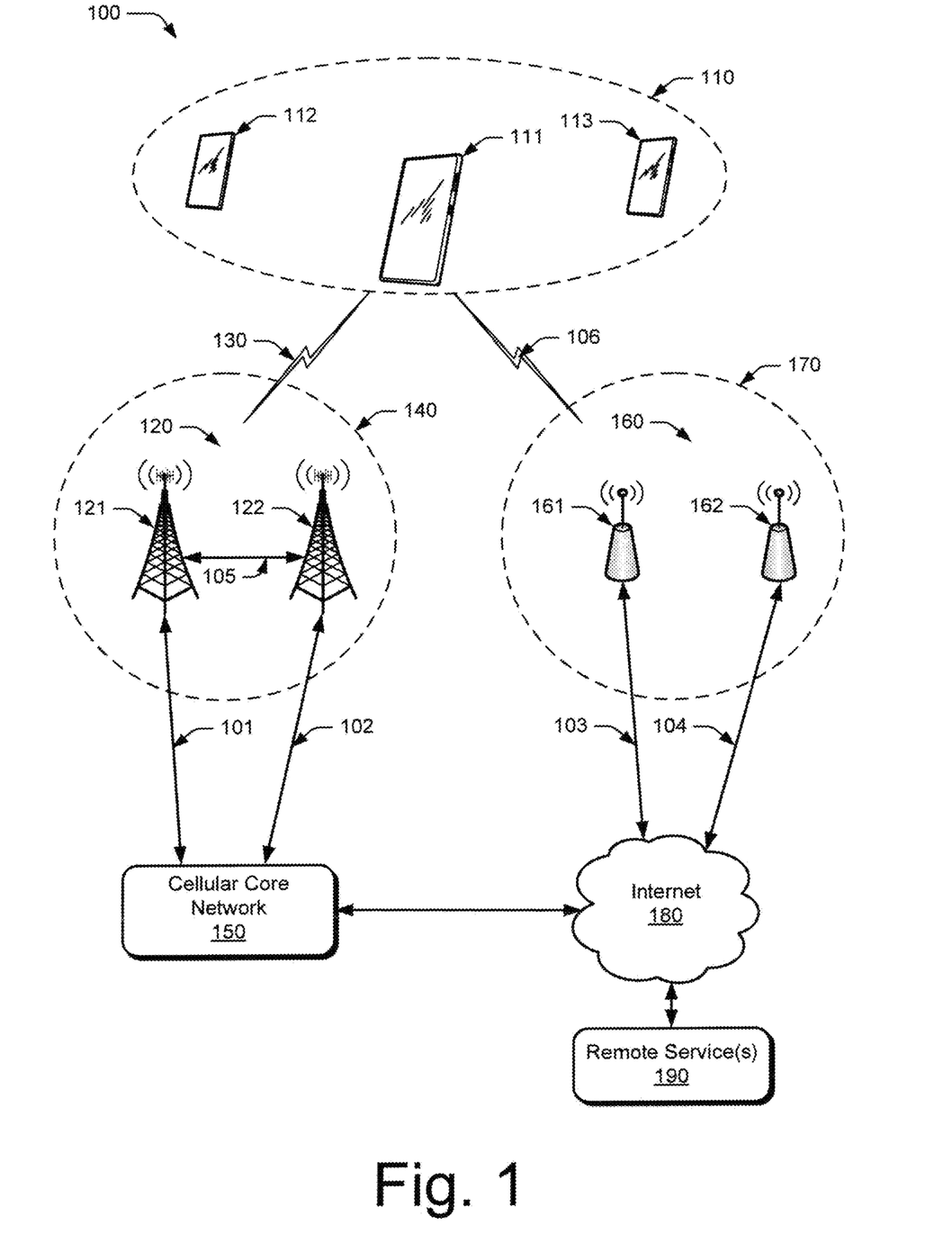
FIG. 1 illustrates an example wireless network environment in which various aspects of a cellular-WLAN network interface can be implemented.

FIG. 1 illustrates an example environment 100, which includes multiple user equipment 110 (UE 110), illustrated as UE 111, UE 112, and UE 113. Each UE 110 can communicate with one or more cellular base stations 120 (illustrated as base stations 121 and 122) through one or more wireless communication links 130 (wireless link 130). In this example, the UE 110 is implemented as a smartphone. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 via the wireless link 130, which may be implemented as any suitable type, or any suitable combination of types, of wireless link. The wireless link 130 can include a downlink of data and control information communicated from the base stations 120 to the UE 110, an uplink of other data and control information communicated from the UE 110 to the base station 120s, or both. The wireless link 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (RAN, Evolved Universal Terrestrial Radio Access Network, E-UTRAN, 5G NR RAN or NR RAN). The base stations 121 and 122 in the NR RAN 140 are connected to a cellular core network (core network) 150. The core network 150 may include a 5G core network, an Evolved Packet Core (EPC), or a combination of both.

The base stations 121 and 122 connect, at 101 and 102 respectively, to the core network 150 via an NG2 interface for control-plane signaling and via an NG3 interface for user-plane data communications when connecting to 5G core network functions. The base stations 121 and 122 connect, at 101 and 102 respectively, to EPC entities via an S1 interface for control-plane signaling and user-plane data communications when connecting to EPC core network entities.

In addition to connections to core network, base stations 120 may communicate with each other. The base stations 121 and 122 communicate, at 105 via an Xn interface if the base stations 120 are 5G base stations, or via an X2 interface if the base stations 120 are E-UTRA base stations.

The core network 150 includes entities and/or functions to support access and mobility for UEs 110. The core network 150 includes entities, functions, and/or gateways that support connectivity to the Internet 180 and remote service(s) 190, which are described below with respect to FIGS. 2 and 3.

The UE 110 also can connect to the Internet 180 using a WLAN connection 106 to a WLAN AP 160, illustrated as WLAN APs 161 and 162 connect to the Internet 180, via the network interfaces 103 and 104. The WLAN AP 160 may be located in a user's home, an office, airport, coffee shop, and so forth. Each WLAN AP 160 may be independently operated, such as in a user's home, may be part of a WLAN network 170, which is illustrated as including WLAN AP 161 and 162. For example, a WLAN network 170 may be an enterprise network or a public network of WLAN APs 160 operated by a wireless network operator. The WLAN wireless network operator may be the same as the operator of the RAN 140 or different than the operator of the RAN 140.

Figure 2:
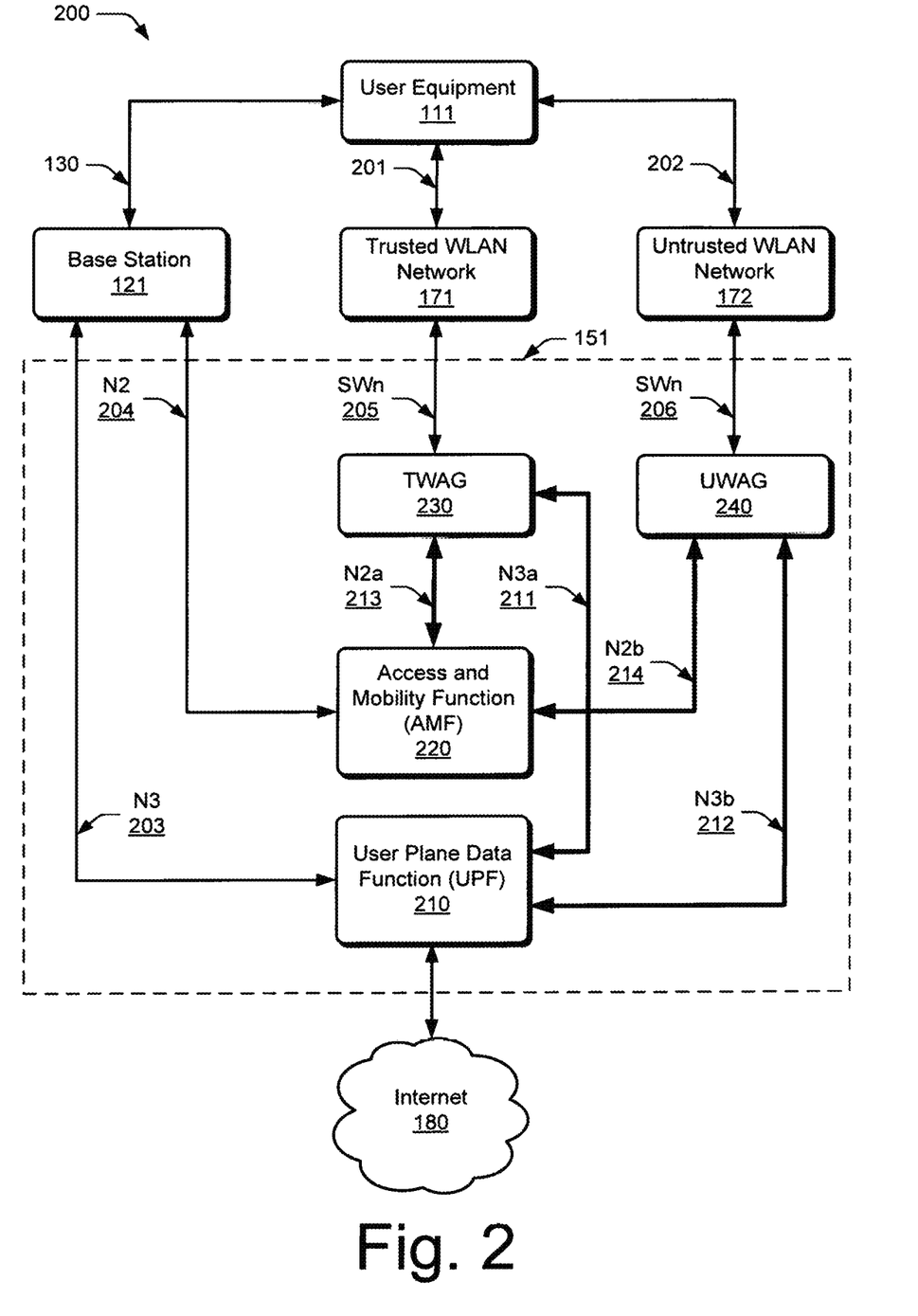
FIG. 2 illustrates an example environment as generally relating to a Fifth Generation New Radio cellular network and WLAN networks that can implement various aspects of a cellular-WLAN network interface.

FIG. 2 illustrates an example environment 200 in which various aspects of a cellular-WLAN network interface as generally related to functions and interfaces in a 5GNR core network 151. The core network 151 may include additional functions and interfaces that are omitted from FIG. 2 for the sake of clarity.

The UE 111 may connect using various radio access technologies, such as the wireless link 130 using a cellular radio access technology to the base station 121 or 122. Additionally, the UE 111 may connect using a WLAN connection 106, shown as 201 and 202, with a WLAN network 170, such as a trusted WLAN network 171 or an untrusted WLAN network 172. The trusted WLAN network 171 and the untrusted WLAN network 172 include one or more WLAN APs 160, such as WLAN AP 161 and WLAN AP 162. A trusted WLAN and the WLAN APs 160 in that trusted WLAN are authenticated to, and trusted by, the cellular network that authenticates the trusted WLAN.

Interconnections between services or functions to the core network 151 and within the core network 151 are defined in terms of interfaces or reference points. New interfaces are added to the core network 151 by the techniques described herein and are illustrated in FIG. 2 with a heavier line weight for the sake of clarity. User-plane data for the UE 111, when connected via the base station 121, is sent over an N3 interface 203 between the base station 121 and a User Plane Function (UPF) 210, which in turn is connected to the Internet 180. Control-plane communications for the UE 110, when connected to the base station 121, is sent over an N2 interface 204 between the base station 121 and an Access and Mobility Management Function (AMF) 220. The AMF 220 provides control-plane functions such as registration and authentication of multiple UE 110, authorization, mobility management, or the like in the 5G NR network.

The trusted WLAN network 171 and the untrusted WLAN network 172 are connected to the core network 151 by SWn interfaces 205 and 206, respectively. The SWn interface 205 connects the trusted WLAN network 171 to a Trusted WLAN Access Gateway (TWAG) 230. An N3a interface 211 is added to the core network 151 between the TWAG 230 and the User Plane Function (UPF) 210. The N3a interface 211 is used to communicate user-plane data between the UE 111 and the Internet 180, when the UE 111 is connected via the trusted WLAN network 171. The SWn interface 206 connects the untrusted WLAN network 172 to an Untrusted WLAN Access Gateway (UWAG) 240. An N3b interface 212 is added to the core network 151, between the UWAG 240 and the User Plane Function (UPF) 210. The N3b interface 212 is used to communicate user-plane data between the UE 111 and the Internet 180, when the UE 111 is connected via the untrusted WLAN network 172.

New interfaces are added between the AMF 220 and the TWAG 230 and between the AMF 220 and the UWAG 240 to enable mobility management, as well as network monitoring and management of WLAN networks 170 by the AMF 220. An N2a interface 213 is added to the core network 151 between the AMF 220 and the TWAG 230 and an N2b interface 214 is added to the core network 151 between the AMF 220 and the UWAG 240. The N2a interface 213 and the N2b interface 214 define an interface including requests, responses, commands, and procedures to add control-plane signaling over WLAN to integrate mobility management and network management between the cellular network and WLAN networks 170.

Figure 3:
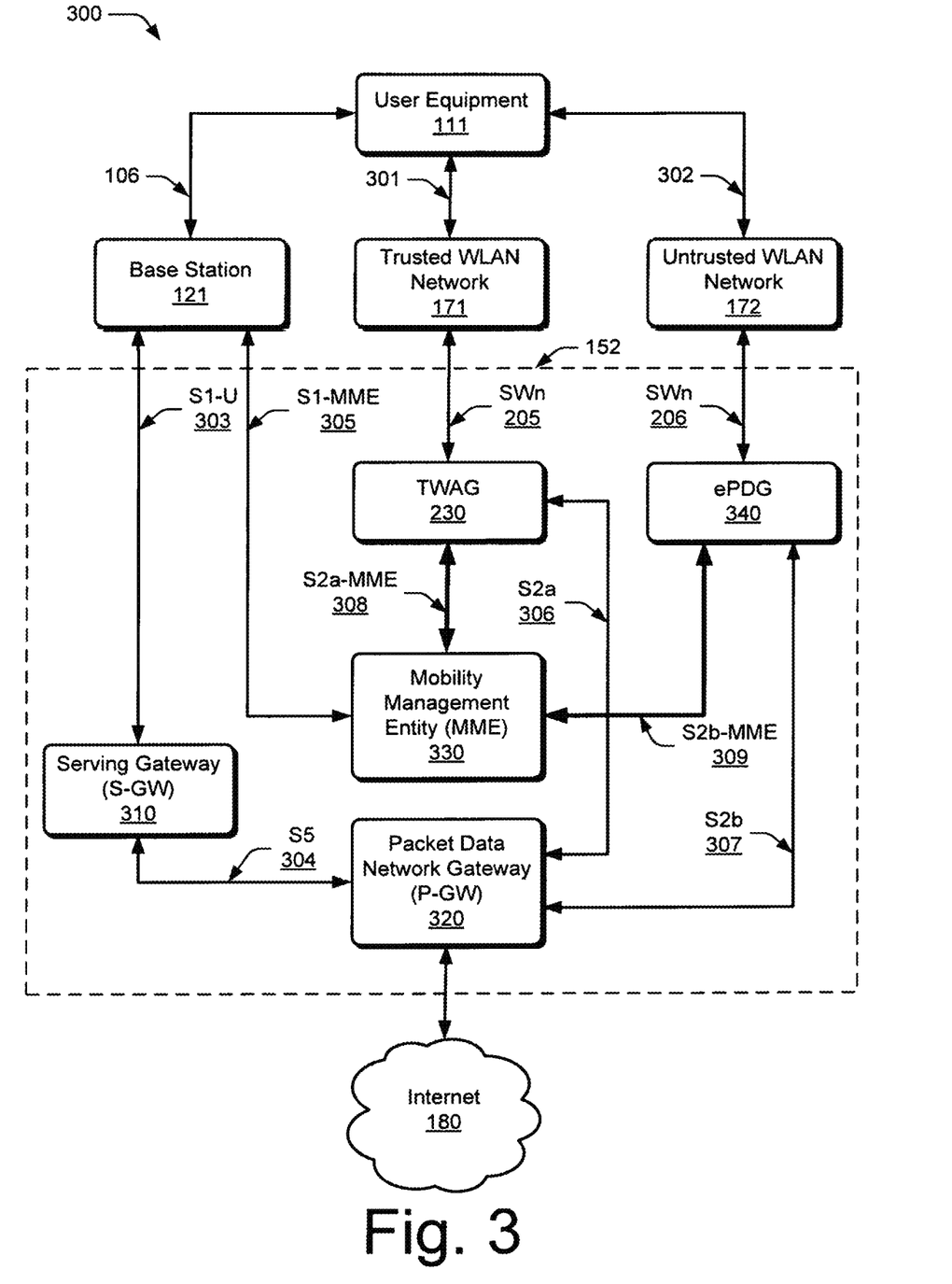
FIG. 3 illustrates an example environment as generally relating to a Long Term Evolution cellular network and WLAN networks that can implement various aspects of a cellular-WLAN network interface.

FIG. 3 illustrates an example environment 300 as generally relating to entities, gateways, and interfaces in an EPC core network 152. The core network 152 may include additional entities, gateways, and interfaces that are omitted from FIG. 3 for the sake of clarity.

The UE 111 may connect using various radio access technologies, such as the wireless link 130 using a cellular radio access technology to the base station 121 or 122. Additionally, the UE 111 may connect via a using the WLAN connection 106, shown as 301 and 302, with the trusted WLAN network 171 or the untrusted WLAN network 172, respectively.

Interconnections between services or functions to the core network 152 and within the core network 152 are defined in terms of interfaces or reference points. New interfaces are added to the core network 152 by the techniques described herein and are illustrated in FIG. 3 with a heavier line weight for the sake of clarity. User-plane data for the UE 111, when connected via the base station 121, is relayed via a Serving Gateway (S-GW) 310 to a Packet Data Network Gateway (P-GW) 320, which in turn is connected to the Internet 180.

The base station 121 is connected to the S-GW 310 by an S1-U interface 303 and the S-GW 310 is connected to the P-GW 320 by an S5 interface 304. Control-plane communications for the UE 111, connected to the base station 121, is sent over an S1-MME interface 305 between the base station 121 and a Mobility Management Entity (MME) 330.

The trusted WLAN network 171 and the untrusted WLAN network 172 are each connected to the core network 152 by SWn interfaces 205 and 206, respectively. The SWn interface 205 connects the trusted WLAN network 171 to the TWAG 230. User-plane data for the UE 111, when connected via the trusted WLAN network 171, is sent over an S2a interface 306 between the TWAG 230 and the P-GW 320, which in turn is connected to the Internet 180. The SWn interface 206 connects the untrusted WLAN network 172 to an Evolved Packet Data Gateway (ePDG) 340. User-plane data for the UE 111, when connected via the untrusted WLAN network 172, is sent over an S2b interface 307 between ePDG 340 and the P-GW 320, which in turn is connected to the Internet 180.

New interfaces are added between the MME 330 and the TWAG 230 and between the MME 330 and the ePDG 340 enable mobility management via WLAN and network monitoring and management of WLAN networks by the MME 330. An S2a-MME interface 308 is added to the core network 152 between the MME 330 and the TWAG 230, and an S2b-MME interface 309 is added between the MME 330 and the ePDG 340. The S2a-MME interface 308 and the S2b-MME interface 309 define an interface including requests, responses, commands, and procedures to add control-plane signaling over WLAN to integrate mobility management and network management between the cellular network and WLAN networks 170.

Example Devices

Figure 4:
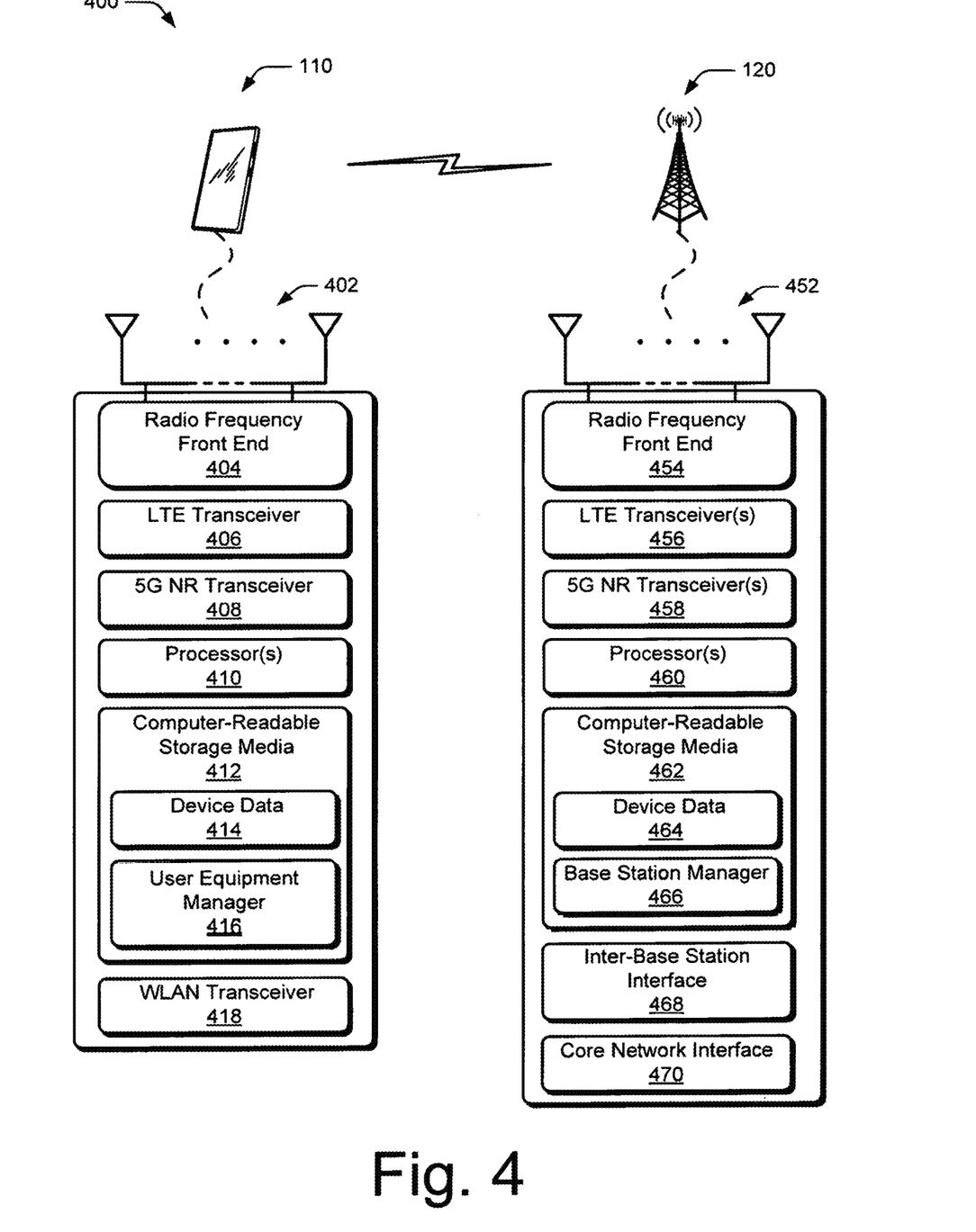
FIG. 4 illustrates an example device diagram for a user equipment device and a base station device that can implement various aspects of a cellular-WLAN network interface.

FIG. 4 illustrates an example device diagram 400 of the multiple UE 110 and the base stations 120. The multiple UE 110 and the base stations 120 may include additional functions and interfaces that are omitted from FIG. 4 for the sake of clarity. The UE 110 includes antennas 402, a radio frequency front end 404 (RF front end 404), an LTE transceiver 406, and a 5G NR transceiver 408 for communicating with base stations 120 in the 5G NR and E-UTRA RANs 140. The RF front end 404 of the UE 110 can couple or connect the LTE transceiver 406, and the 5G NR transceiver 408 to the antennas 402 to facilitate various types of wireless communication. The antennas 402 of the UE 110 may include an array of multiple antennas that are configured similar to or differently from each other. The antennas 402 and the RF front end 404 can be tuned to, and/or be tunable to, one or more frequency bands defined by the 3GPP LTE and 5G NR communication standards and implemented by the LTE transceiver 406, and/or the 5G NR transceiver 408. Additionally, the antennas 402, the RF front end 404, the LTE transceiver 406, and/or the 5G NR transceiver 408 may be configured to support beamforming for the transmission and reception of communications with the base stations 120. By way of example and not limitation, the antennas 402 and the RF front end 404 can be implemented for operation in sub-gigahertz bands, sub-6 GHZ bands, and/or above 6 GHz bands that are defined by the 3GPP LTE and 5G NR communication standards.

The UE 110 also includes processor(s) 410 and computer-readable storage media 412 (CRM 412). The processor 410 may be a single core processor or a multiple core processor composed of a variety of materials, such as silicon, polysilicon, high-K dielectric, copper, and so on. The computer-readable storage media described herein excludes propagating signals. CRM 412 may include any suitable memory or storage device such as random-access memory (RAM), static RAM (SRAM), dynamic RAM (DRAM), non-volatile RAM (NVRAM), read-only memory (ROM), or Flash memory useable to store device data 414 of the UE 110. The device data 414 includes user data, multimedia data, beam-forming codebooks, applications, and/or an operating system of the UE 110, which are executable by processor(s) 410 to enable user-plane communication, control-plane signaling, and user interaction with the UE 110.

CRM 412 also includes a user equipment manager 416. Alternately or additionally, the user equipment manager 416 may be implemented in whole or part as hardware logic or circuitry integrated with or separate from other components of the UE 110. In at least some aspects, the user equipment manager 416 configures the RF front end 404, the LTE transceiver 406, and/or the 5G NR transceiver 408 to implement the techniques for an uplink handover pilot described herein.

The UE 110 includes a WLAN transceiver 418 that implements the functions of a WLAN station (STA). The WLAN transceiver 418 may be coupled to the RF front end 404 and antennas 402, may include an RF front end and antennas, or both. The user equipment manager 416 may control the configuration and operation of the WLAN transceiver 418 to coordinate operation in the WLAN and cellular frequency bands, or the configuration and operation of the WLAN transceiver 418 may be distributed between the user equipment manager 416 and the WLAN transceiver 418 in any suitable manner. The WLAN transceiver 418 is configured to operate in any WLAN frequency band and using any protocols defined in the IEEE 802.11 specifications. The WLAN transceiver 418 may also be configured to support beamformed communication.

The device diagram for the base stations 120, shown in FIG. 4, includes a single network node (e.g., a gNode B). The functionality of the base stations 120 may be distributed across multiple network nodes or devices and may be distributed in any fashion suitable to perform the functions described herein. The base stations 120 include antennas 452, a radio frequency front end 454 (RF front end 454), one or more LTE transceivers 456, and/or one or more 5G NR transceivers 458 for communicating with the UE 110. The RF front end 454 of the base stations 120 can couple or connect the LTE transceivers 456 and the 5G NR transceivers 458 to the antennas 452 to facilitate various types of wireless communication. The antennas 452 of the base stations 120 may include an array of multiple antennas that are configured similar to or differently from each other. The antennas 452 and the RF front end 454 can be tuned to, and/or be tunable to, one or more frequency band defined by the 3GPP LTE and 5G NR communication standards, and implemented by the LTE transceivers 456, and/or the 5G NR transceivers 458. Additionally, the antennas 452, the RF front end 454, the LTE transceivers 456, and/or the 5G NR transceivers 458 may be configured to support beamforming, such as Massive-MIMO, for the transmission and reception of communications with the UE 110.

The base stations 120 also include processor(s) 460 and computer-readable storage media 462 (CRM 462). The processor 460 may be a single core processor or a multiple core processor composed of a variety of materials, such as silicon, polysilicon, high-K dielectric, copper, and so on. CRM 462 may include any suitable memory or storage device such as random-access memory (RAM), static RAM (SRAM), dynamic RAM (DRAM), non-volatile RAM (NVRAM), read-only memory (ROM), or Flash memory useable to store device data 464 of the base stations 120. The device data 464 includes network scheduling data, radio resource management data, beamforming codebooks, applications, and/or an operating system of the base stations 120, which are executable by processor(s) 460 to enable communication with the UE 110.

CRM 462 also includes a base station manager 466. Alternately or additionally, the base station manager 466 may be implemented in whole or part as hardware logic or circuitry integrated with or separate from other components of the base stations 120. In at least some aspects, the base station manager 466 configures the LTE transceivers 456 and the 5G NR transceivers 458 for communication with the UE 110, as well as communication with a core network. The base stations 120 include an inter-base station interface 468, such as an Xn and/or X2 interface, which the base station manager 466 configures to exchange user-plane and control-plane data between another base station 120, to manage the communication of the base stations 120 with the UE 110. The base stations 120 include a core network interface 470 that the base station manager 466 configures to exchange user-plane and control-plane data with core network functions and entities. This core network interface 470 may include interfaces such as the NG2 interface 101, the NG3 interface 102, the N2 interface 204, the N3 interface 203, the S1-U interface 303, and the S1-MME 305 as described previously with respect to FIGS. 1-3.

Figure 5:
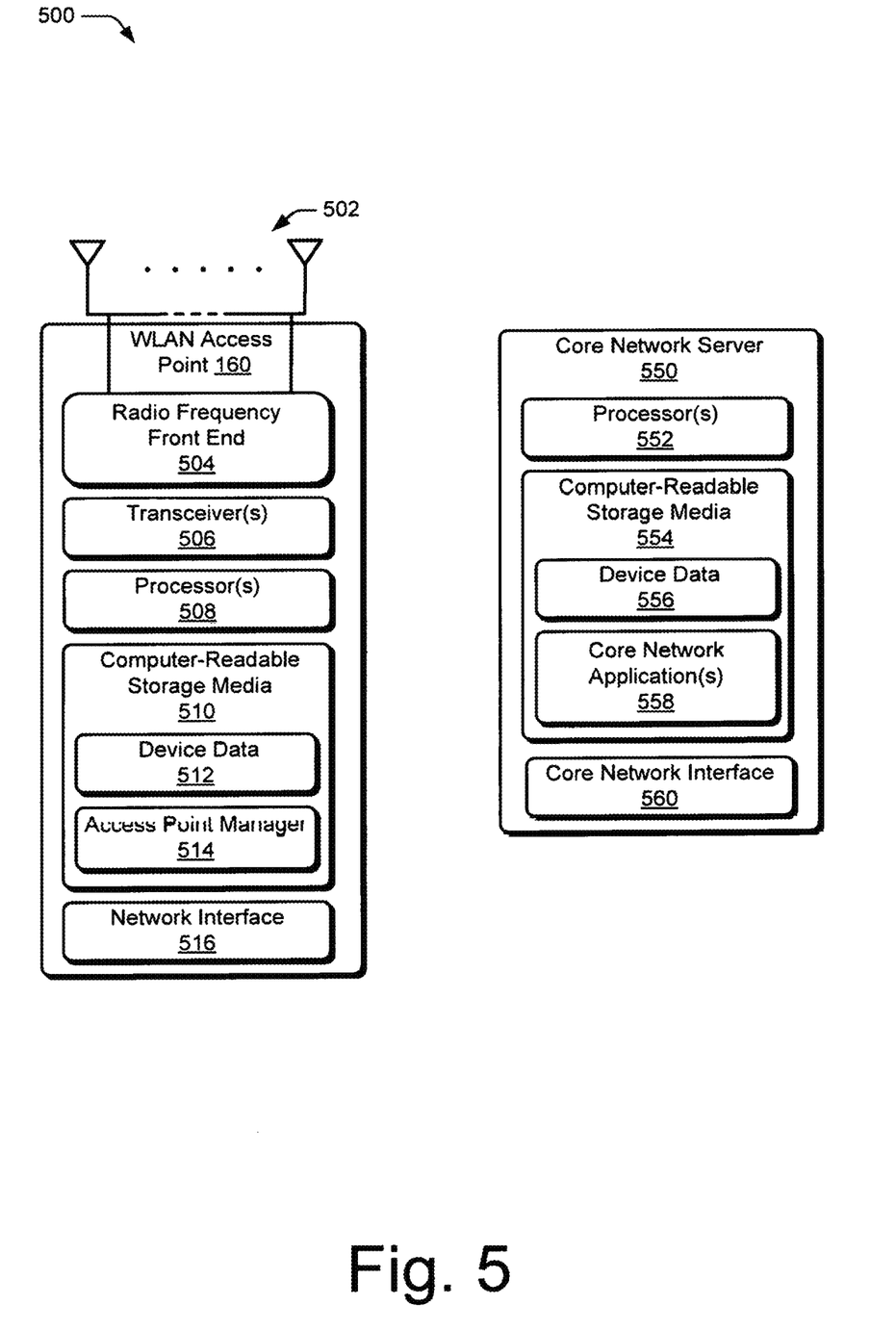
FIG. 5 illustrates an example device diagram for a WLAN AP device and a core network server device that can implement various aspects of a cellular-WLAN network interface.

FIG. 5 illustrates an example device diagram 500 of the WLAN AP 160 and a core network server 550. The WLAN AP 160 and a core network server 550 may include additional functions and interfaces that are omitted from FIG. 5 for the sake of clarity.

The WLAN AP 160 includes antennas 502, a radio frequency front end 504 (RF front end 504), one or more transceivers 506 that are configured for WLAN communication with the UE 110. The RF front end 504 can couple or connect the transceivers 506 to the antennas 502 to facilitate various types of wireless communication. The antennas 502 of the WLAN AP 160 may include an array of multiple antennas that are configured similarly to or differently from each other. The antennas 502 and the RF front end 504 can be tuned to, and/or be tunable to, one or more frequency bands defined by the IEEE 802.11 communication standards and implemented by the transceivers 506. Additionally, the antennas 502, the RF front end 504, and/or the transceivers 506 may be configured to support beamforming for the transmission and reception of communications with the UE 110.

The WLAN AP 160 also includes processor(s) 508 and computer-readable storage media 510 (CRM 510). The processor 508 may be a single core processor or a multiple core processor composed of a variety of materials, such as silicon, polysilicon, high-K dielectric, copper, and so on. CRM 510 may include any suitable memory or storage device such as random-access memory (RAM), static RAM (SRAM), dynamic RAM (DRAM), non-volatile RAM (NVRAM), read-only memory (ROM), or Flash memory useful to store device data 512 of the WLAN AP 160. The device data 512 includes network scheduling data, radio resource management data, applications, and/or an operating system of the WLAN AP 160, which are executable by processor(s) 508 to enable communication with the UE 110.

CRM 510 also includes an access point manager 514, which, in one implementation, is embodied on CRM 510 (as shown). Alternately or additionally, the access point manager 514 may be implemented in whole or part as hardware logic or circuitry integrated with or separate from other components of the WLAN AP 160. In at least some aspects, the access point manager 514 configures the transceivers 506 for communication with the UE 110, as well as communication of user-plane and control-plane data with the core network 150 via a network interface 516.

The core network server 550 may provide all or part of a function, entity, service, and/or gateway in the core network 150. Each function, entity, service, and/or gateway in the core network 150 may be provided as a service in the core network 150, distributed across multiple servers, or embodied on a dedicated server. For example, the core network server 550 may provide the all or a portion of the services or functions of the UPF 210, AMF 220, TWAG 230, UWAG 240, S-GW 310, P-GW 320, MME 330, or ePDG 340. The core network server 550 is illustrated as being embodied on a single server that includes processor(s) 552 and computer-readable storage media 554 (CRM 554). The processor 552 may be a single core processor or a multiple core processor composed of a variety of materials, such as silicon, poly-silicon, high-K dielectric, copper, and so on. CRM 554 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 556 of the core network server 550. The device data 556 includes data to support a core network function or entity, and/or an operating system of the core network server 550, which are executable by processor(s) 552.

CRM 554 also includes one or more core network applications 558, which, in one implementation, is embodied on CRM 554 (as shown). The one or more core network applications 558 may implement the functionality of the UPF 210, AMF 220, TWAG 230, UWAG 240, S-GW 310, P-GW 320, MME 330, or ePDG 340.

Alternately or additionally, the one or more core network applications 558 may be implemented in whole or part as hardware logic or circuitry integrated with or separate from other components of the core network server 550. The core network server 550 also includes a core network interface 560 for communication of user-plane and control-plane data with the other functions or entities in the core network 150, base stations 120, or WLAN networks 170.

Cellular-WLAN Network Interface Application Programming Interface

In aspects the cellular-WLAN network interface provides an application programming interface (API) for requests, responses, commands, and procedures to enable an AMF 220 or MME 330 to monitor and/or manage WLAN networks 170 in addition to the cellular network. The AMF 220 or MME 330 may be able to monitor and make requests of all WLAN networks 170 that support the API, but may be limited to reconfiguring or controlling WLAN networks 170 that are not directly under the control of a network operator of the AMF 220 or MME 330. For example, a cellular network operator may have control of the trusted WLAN network 171 and thus be able to reconfigure the trusted WLAN network 171, but may not have control of the untrusted WLAN network 172 and the AMF 220 or MME 330 may only be able to monitor the untrusted WLAN network 172.

To implement the cellular-WLAN network interface, the API is supported in several interfaces in the cellular and WLAN networks. The API for the cellular-WLAN network interface is included in a messaging interface of each WLAN STA, such as in the WLAN transceiver 418 or the user equipment manager 416 in the UE 110. The API for the cellular-WLAN network interface is included in a messaging interface of each WLAN AP 160, such as in the network interface 516 or in the access point manager 514 in the WLAN AP 160. The network interface 516 may include interfaces such as the SWn interfaces 205 or 206, the N2a interface 213, the N2b interface 214, the N3a interface 211, the N3b interface 212, the S2a-MME interface 308, and the S2b-MME interface 309, as described previously with respect to FIGS. 2 and 3.

To provide the AMF 220 or MME 330 access to the APIs in the WLAN stations and APs, interfaces are added to the core network 150, as well as implementing the API in the TWAG 230 and the UWAG 240 in 5G NR core networks and in the TWAG 230 and the ePDG 340 in EPC networks. The TWAG 230, UWAG 240, or ePDG 340 forwards requests, responses, and commands, between the AMF 220 or MME 330 and the WLAN APs 160 and WLAN STA in the UE 110. In the 5G NR core network, the N2a interface 213 is added between the AMF 220 and the TWAG 230 to enable the AMF 220 to access the API for the trusted WLAN network 171, and the N2b interface 230 is added between the AMF 220 and the UWAG 240 to enable the AMF 220 to access the API for the untrusted WLAN network 172. In the EPC, the S2a-MME interface 308 is added between the MME 330 and the TWAG 230 to enable the MME 330 to access the API for the trusted WLAN network 171, and the S2b-MME interface 309 is added between the MME 330 and the ePDG 340 to enable the MME 330 to access the API for the untrusted WLAN network 172.

The API provides a number of requests that can be made to the API included in the WLAN AP 160, and corresponding responses provided by that API in the WLAN AP 160. In the example requests and responses below, the interface syntax is illustrated in the context of a 5GNR core network interface, such as "5GNR_N2[a/b]_request name," where "N2" indicates that the request is sent via an N2 interface, and either "a" or "b" in "[a/b]" is selected to indicate that the request is being made via the N2a interface 213 for the trusted WLAN network 171 or via the N2b interface 214 for the untrusted WLAN network 172. The "request name" indicates which request/response is being selected in the API. Although the following examples are illustrated with respect to the 5G NR core network, a similar syntax, such as substituting "EUTRAN_S2[a/b]-MME" for "5GNR_N2[a/b]" may be used for EPC networks, where either "a" or "b" in "[a/b]" is selected to indicate that the request is being made via the S2a-MME interface 308 for the trusted WLAN network 171 or via the S2b-MME interface 309 for the untrusted WLAN network 172.

In an aspect, the API provides requests and responses for information from the WLAN AP 160 that include:
Request and report a Received Signal Strength Indicator (RSSI) for the UE 110:
5GNR_N2[a/b]_AP_UE_RSSI_Request
5GNR_N2[a/b]_AP_UE_RSSI_Response
Request and report a backhaul status of the WLAN AP 160 that includes one or more of a throughput or a ping latency:
5GNR_N2[a/b]_AP_Backhaul_Status_Request
5GNR_N2[a/b]_AP_Backhaul_Status_Response
Request and report a current radio frequency in use by of the WLAN AP 160:
5GNR_N2[a/b]_AP_Frequency_Request
5GNR_N2[a/b]_AP_Frequency_Response
Request and report a current transmit (Tx) power of the WLAN AP 160:
5GNR_N2[a/b]_AP_Tx_Power_Request
5GNR_N2[a/b]_AP_Tx_Power_Response Request and report a current transmit (Tx) bandwidth of the WLAN AP 160:
  5GNR_N2[a/b]_AP_Tx_BW_Request
  5GNR_N2[a/b]_AP_Tx_BW_Response
Request and report beamforming parameters of the WLAN AP 160:
  5GNR_N2[a/b]_AP_Beamforming_Request
  5GNR_N2[a/b]_AP_Beamforming_Response
Request and report neighbor station measurements from the WLAN AP 160:
  5GNR_N2[a/b]_AP_Neighbor_Request
  5GNR_N2[a/b]_AP_Neighbor_Response
Request and report an AP identity of the WLAN AP 160:
  5GNR_N2[a/b]_AP_Identity_Request
  5GNR_N2[a/b]_AP_Identity_Response
Request and report a measurement of WLAN channel interference from the WLAN AP 160:
  5GNR_N2[a/b]_AP_Interference_Request
  5GNR_N2[a/b]_AP_Interference_Response In another aspect, the API provides commands to the WLAN AP 160 that include:
  Command the WLAN AP 160 to change an RF frequency or channel:
    5GNR_N2[a/b]_AP_Channel_Set
  Command the WLAN AP 160 to change a Transmit (Tx) power setting:
    5GNR_N2[a/b]_AP_Tx_Power_Set
  Command the WLAN AP 160 to change a Service Set IDentifier (SSID) of the WLAN AP 160:
    5GNR_N2[a/b]_AP_SSID_Set
  Command the WLAN AP 160 to change a channel bandwidth:
    5GNR_N2[a/b]_AP_BW_Set
  Command the WLAN AP 160 to change a configuration of the WLAN AP 160:
    5GNR_N2[a/b]_AP_Config_Set In further aspect, the API provides requests and responses for information from the UE 110 that include:
  Request and report an RSSI for a serving WLAN AP 160 of the UE 110:
    5GNR_N2[a/b]_UE_Serving_RSSI_Request
    5GNR_N2[a/b]_UE_Serving_RSSI_Response
  Request and report an RSSI for neighbor WLAN AP 160 of the UE 110:
    5GNR_N2[a/b]_UE_Neighbor_RSSI_Request
    5GNR_N2[a/b]_UE_Neighbor_RSSI_Response
  Request and report a UE identity of the UE 110:
    5GNR_N2[a/b]_UE_ID_Request
    5GNR_N2[a/b]_UE_ID_Response
  Request and report a UE transmit (Tx) power adjustment of the UE 110:
    5GNR_N2[a/b]_UE_Tx_Power_Request
    5GNR_N2[a/b]_UE_Tx_Power_Response In a further aspect, the API provides commands to the UE 110 that includes:
  Command the UE to handoff to a WLAN channel, another WLAN AP, or to the cellular network:
    5GNR_N2[a/b]_UE_HO_Request
    5GNR_N2 [a/b]_UE_HO_Response To support the handoff request, the API may also include additional requests and responses to measure various radio parameters of the RAN 140, the trusted WLAN network 171 and/or the untrusted WLAN network 172. The AMF 220 or MME 330 may use these additional measurements to determine parameters for potential handoff candidates to receive the UE 110 during the handoff.

In an additional aspect, the new core network interfaces and the API provide the AMF 220 or the MME 330 with access to perform a procedure with the UE 110 via the trusted WLAN network 171 or the untrusted WLAN network 172. In addition to performing these procedures via the cellular network, the new core network interfaces and the API enable the AMF 220 or the MME 330 to perform procedures via a WLAN network 170, including a UE authentication procedure and a UE capability exchange procedure.

Example Methods

Example methods 600-800 are described with reference to FIGS. 6-8 in accordance with one or more aspects of a cellular-WLAN network interface. The order in which the method blocks are described are not intended to be construed as a limitation, and any number of the described method blocks can be combined in any order, or skipped to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
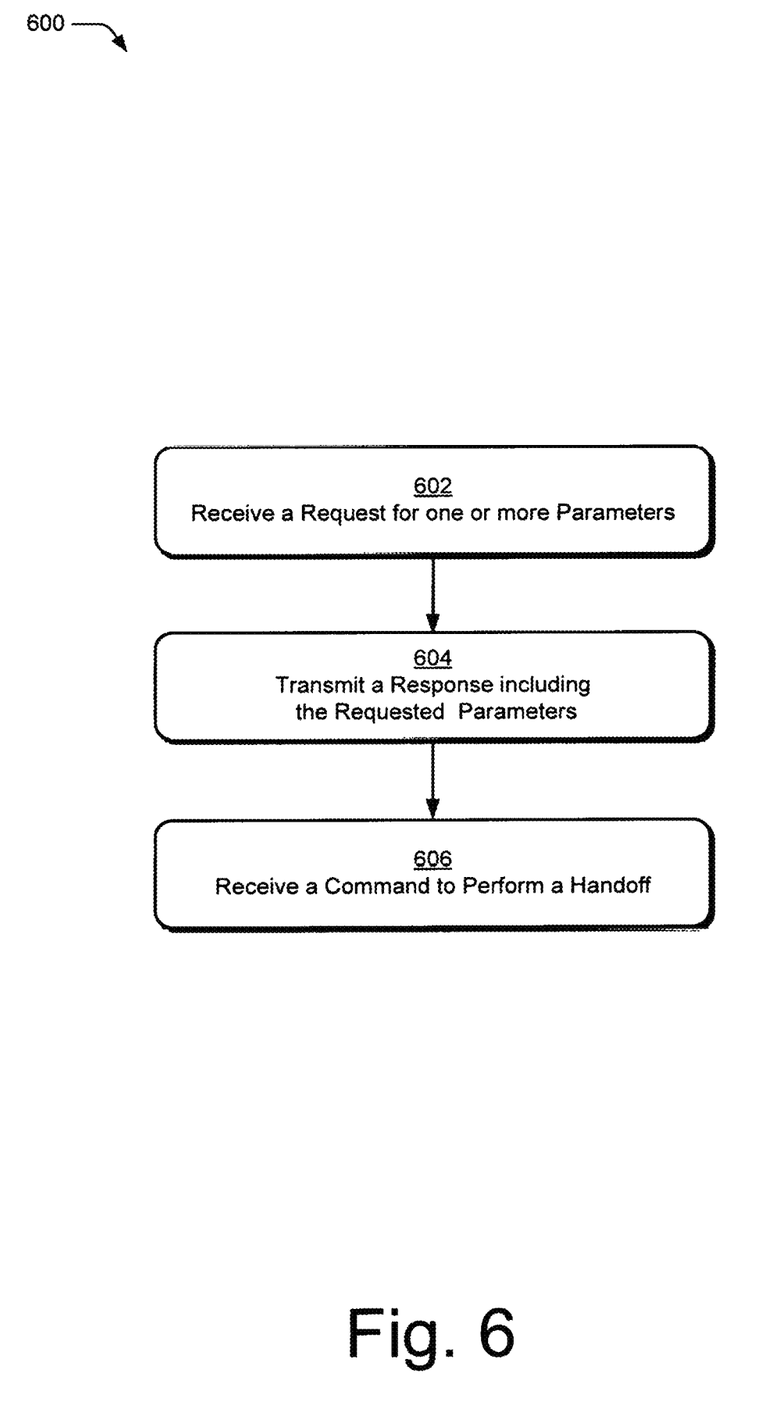
FIG. 6 illustrates an example method of a cellular-WLAN network interface as generally related to the user equipment in accordance with aspects of the techniques described herein.

FIG. 6 illustrates example method(s) 600 of a cellular-WLAN network interface as generally related to the UE 110. At block 602, a UE receives a request from the core network function for one or more parameters related to a WLAN network that the UE is using for WLAN communication. For example, the UE 110 receives a request from the AMF 220 via the TWAG 230 or the UWAG 240, or the MME 330 via the TWAG 230 or the ePDG 340, for one or more parameters related to the WLAN network 171 that the UE 110 is using for WLAN communication.

At block 604, in response to the request, the UE transmits a response to the core network function that includes the one or more requested parameters. For example, in response to the request, the UE 110 transmits a response to the AMF 220 or the MME 330 that includes the one or more requested parameters.

At block 606, the UE receives a command to handoff from the serving WLAN AP to one of the neighbor WLAN APs or the cellular network. For example, the UE 110 receives a command from the AMF 220 or the MME 330 to handoff from the serving WLAN AP to one of the neighbor WLAN APs or the cellular network.

Figure 7:
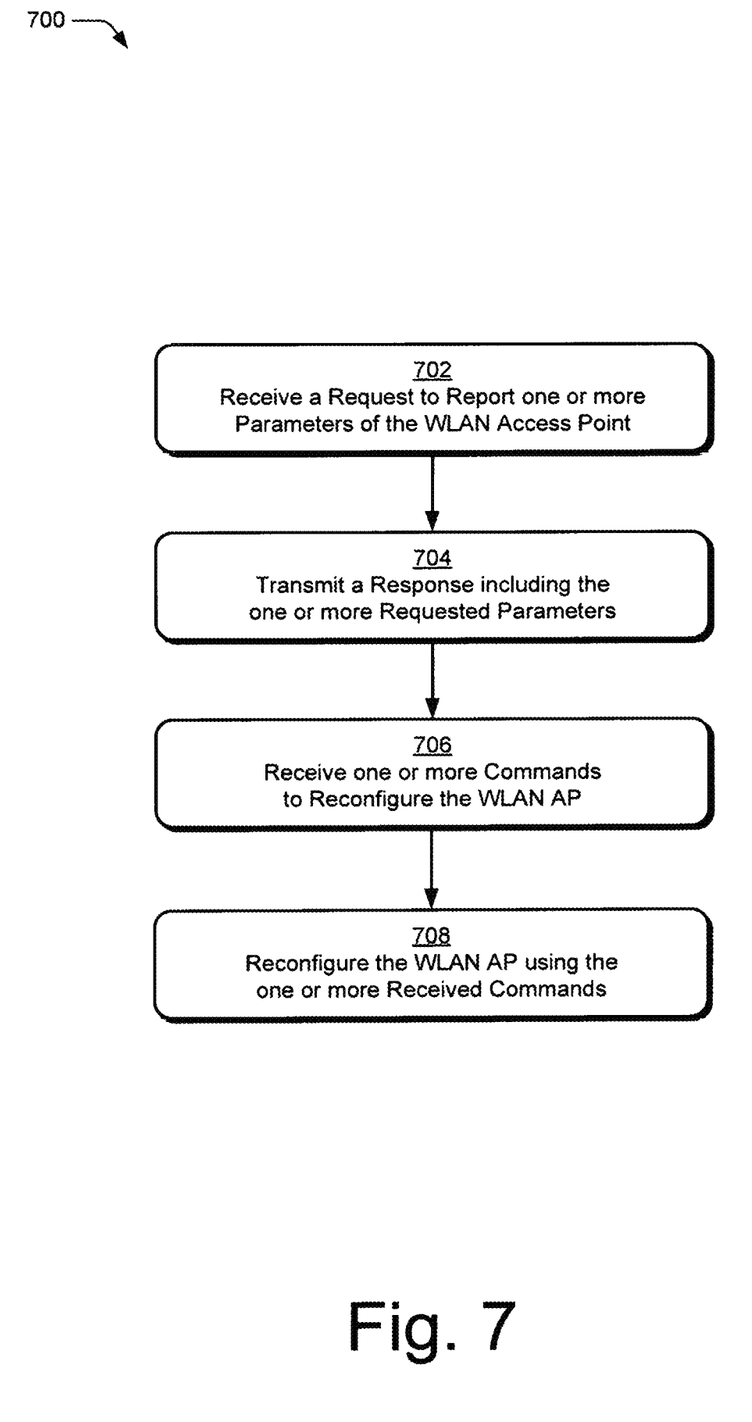
FIG. 7 illustrates an example method of a cellular-WLAN network interface as generally related to the WLAN AP in accordance with aspects of the techniques described herein.

FIG. 7 illustrates example method(s) 700 of a cellular-WLAN network interface as generally related to the WLAN AP 160. At block 702, a WLAN AP receives a request from the core network function to report one or more parameters of the WLAN AP to the core network function. For example, the WLAN AP 160 receives a request from the AMF 220, via the TWAG 230 or the UWAG 240, or the MME 330 via the TWAG 230 or the ePDG 340 to report one or more parameters of the WLAN AP 160 to the AMF 220 or the MME 330.

At block 704, in response to the request, the WLAN AP transmits, to the core network function, a response including the one or more requested parameters. For example, in response to the request, the WLAN AP 160 transmits a response including the one or more requested parameters to the AMF 220 or the MME 330.

At block 706, the WLAN AP receives one or more commands to reconfigure the WLAN AP. For example, the WLAN AP 160 receives one or more commands to reconfigure the WLAN AP 160 from the AMF 220 or the MME 330.

At block 708, based on the reception, the WLAN AP reconfigures the WLAN AP using the one or more received commands. For example, the WLAN AP 160 reconfigures the WLAN AP 160 using the one or more commands received from the AMF 220 or the MME 330.

Figure 8:
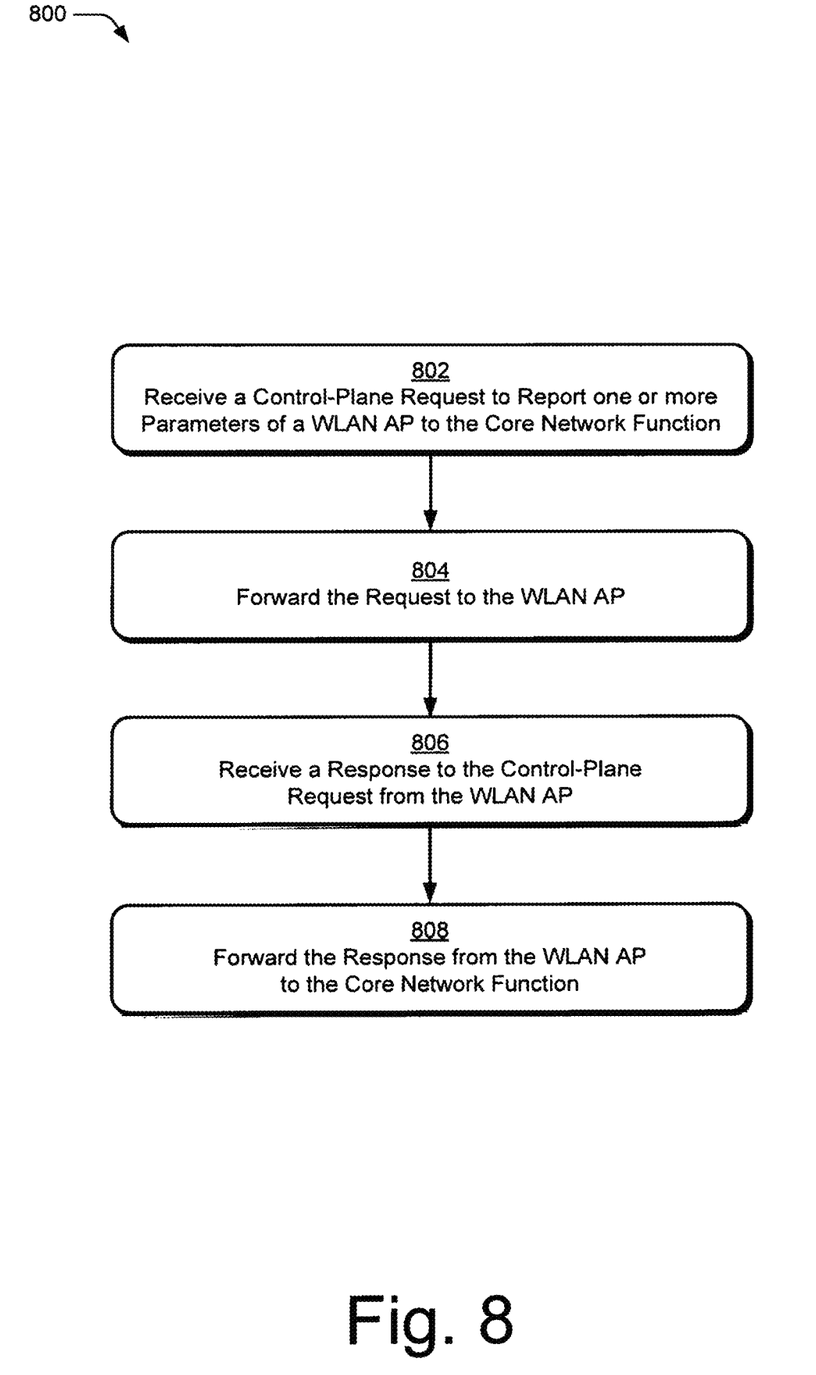
FIG. 8 illustrates an example method of a cellular-WLAN network interface as generally related to a WLAN gateway of a cellular network in accordance with aspects of the techniques described herein.

FIG. 8 illustrates example method(s) 800 of a cellular-WLAN network interface as generally related to a WLAN gateway of a cellular network. At block 802, a WLAN gateway receives, a control-plane request from a core network function to report one or more parameters of a WLAN AP to the core network function. For example, the Trusted WLAN Access Gateway (TWAG) 220 via the N2a interface 213 or the SWn interface 205, the Untrusted WLAN Access Gateway (UWAG) 224 via the N2b interface 214, or the Evolved Packet Data Gateway (ePDG) 340 via the SWn interface 206, receives a request from the AMF 220 or the MME 330 to report one or more parameters of the WLAN AP 160.

At block 804, the WLAN gateway forwards the request to the WLAN AP that is effective to cause the WLAN AP to respond to the request. For example, the Trusted WLAN Access Gateway (TWAG) 220, the Untrusted WLAN Access Gateway (UWAG) 224, or the Evolved Packet Data Gateway (ePDG) 340 forwards the request to the WLAN AP 160 that is effective to cause the WLAN AP 160 to respond to the request.

At block 806, the WLAN gateway receives a response to the control-plane request from the WLAN AP. For example, the Trusted WLAN Access Gateway (TWAG) 220, the Untrusted WLAN Access Gateway (UWAG) 224, or the Evolved Packet Data Gateway (ePDG) 340 receives a response to the control-plane request from the WLAN AP 160.

At block 808, the WLAN gateway forwards the response from the WLAN AP to the core network function. For example, the Trusted WLAN Access Gateway (TWAG) 220 via the N2a interface 213 or the SWn interface 205, the Untrusted WLAN Access Gateway (UWAG) 224 via the N2b interface 214, or the Evolved Packet Data Gateway (ePDG) 340 via the SWn interface 206, forwards the response from the WLAN AP 160 to the AMF 220 or the MME 330.

Although aspects of a cellular-WLAN network interface have been described in language specific to features and/or methods, the subject of the appended claims is not necessarily limited to the specific features or methods described. Rather, the specific features and methods are disclosed as example implementations of the cellular-WLAN network interface, and other equivalent features and methods are intended to be within the scope of the appended claims. Further, various different aspects are described, and it is to be appreciated that each described aspect can be implemented independently or in connection with one or more other described aspects.

What is claimed is:

1. A method to monitor and manage a wireless local area network (WLAN) access point (AP) in a WLAN network by a WLAN gateway of a cellular network, the method comprising:
   receiving, by the WLAN gateway, a control-plane request from a core network function to report one or more parameters of the WLAN AP to the core network function, the one or more parameters of the WLAN AP including a current radio frequency of the WLAN AP;
   forwarding the control-plane request to the WLAN AP, the forwarding being effective to cause the WLAN AP to respond to the control-plane request;
   receiving a response to the control-plane request from the WLAN AP the response including the current radio frequency of the WLAN AP;
   forwarding the response from the WLAN AP to the core network function;
   receiving, by the WLAN gateway, another control-plane request from the core network function to command the WLAN AP to change a radio frequency of the WLAN AP; and
   forwarding the command to the WLAN AP, the forwarding being effective to cause the WLAN AP to change the radio frequency of the WLAN AP.

2. The method of claim 1, the method further comprising:
   receiving, by the WLAN gateway, user-plane data for a user equipment (UE) connected to the WLAN AP from a User Plane Function (UPF); and
   relaying the user-plane data to the WLAN AP that is effective to cause the WLAN AP to relay the user-plane data to the UE.

3. The method of claim 2, wherein the cellular network is a Fifth Generation New Radio (5G NR) network, wherein the WLAN gateway receives the user-plane data from the UPF via an N3a interface, and wherein the WLAN gateway is a Trusted WLAN Access Gateway (TWAG).

4. The method of claim 2, wherein the cellular network is a 5G NR network, wherein the WLAN gateway receives the user-plane data from the UPF via an N3b interface, and the WLAN gateway is an Untrusted WLAN Access Gateway (UWAG).

5. A WLAN gateway device in a cellular network comprising:
   a core network interface; and
   a processor and memory system to implement a WLAN gateway manager application configured to:
      receive a control-plane request from a core network function to report one or more parameters of a wireless local area network (WLAN) access point (AP) in a WLAN network to the core network function, the one or more parameters of the WLAN AP including a current radio frequency of the WLAN AP;
      forward the control-plane request to the WLAN AP that is effective to cause the WLAN AP to respond to the control-plane request;
      receive a response to the control-plane request from the WLAN AP the response including the current radio frequency of the WLAN AP;
      forward the response from the WLAN AP to the core network function;
      receive another control-plane request from the core network function to command the WLAN AP to change a radio frequency of the WLAN AP; and
      forward the command to the WLAN AP, the forwarding being effective to cause the WLAN AP to change the radio frequency of the WLAN AP.

6. The WLAN gateway device of claim 5, the WLAN gateway manager application configured to:
   receive user-plane data for a user equipment (UE) connected to the WLAN AP from a User Plane Function (UPF); and
   relay the user-plane data to the WLAN AP, the relaying being effective to cause the WLAN AP to relay the user-plane data to the UE.

7. The WLAN gateway device of claim 6, wherein the cellular network is a Fifth Generation New Radio (5G NR) network, wherein the WLAN gateway device receives the user-plane data from the UPF via an N3a interface, and wherein the WLAN gateway device is a Trusted WLAN Access Gateway (TWAG).

8. The WLAN gateway device of claim 6, wherein the cellular network is a 5G NR network, wherein the WLAN gateway device receives the user-plane data from the UPF via an N3b interface, and the WLAN gateway device is an Untrusted WLAN Access Gateway (UWAG).

9. A system comprising:
   a wireless local area network (WLAN) access gateway; and
   a mobility management function connected to the WLAN access gateway by a first interface; and
   the WLAN access gateway configured to:
      receive, from the mobility management function and via the first interface, a control-plane request to report one or more parameters of a WLAN access point (AP) in a WLAN network, the one or more parameters of the WLAN AP including a current radio frequency of the WLAN AP;
      forward the control-plane request to the WLAN AP that is effective to cause the WLAN AP to respond to the control-plane request;
      receive a response to the control-plane request from the WLAN AP the response including the current radio frequency of the WLAN AP;
      forward, to the mobility management function and via the first interface, the response from the WLAN AP;
      receive another control-plane request from the mobility management function to command the WLAN AP to change a radio frequency of the WLAN AP; and
      forward the command to the WLAN AP, the forwarding being effective to cause the WLAN AP to change the radio frequency of the WLAN AP.

10. The system of claim 9, the system comprising:
   a User Plane Function (UPF) connected to the WLAN access gateway by a second interface;
   the WLAN access gateway configured to:
      receive, from the UPF via the second interface, user-plane data for a user equipment (UE) connected to the WLAN AP; and
      relay the user-plane data to the WLAN AP, the relaying being effective to cause the WLAN AP to relay the user-plane data to the UE.

11. A method to monitor and manage a wireless local area network (WLAN) access point (AP) in a WLAN network by a WLAN gateway of a cellular network, the method comprising:
   receiving, by the WLAN gateway, a control-plane request from a core network function to report one or more parameters of the WLAN AP to the core network function, the one or more parameters of the WLAN AP including a current transmit power of the WLAN AP;
   forwarding the control-plane request to the WLAN AP, the forwarding being effective to cause the WLAN AP to respond to the control-plane request;
   receiving a response to the control-plane request from the WLAN AP the response including the current transmit power of the WLAN AP;
   forwarding the response from the WLAN AP to the core network function;
   receiving, by the WLAN gateway, another control-plane request from the core network function to command the WLAN AP to change a transmit power of the WLAN AP; and
   forwarding the command to the WLAN AP, the forwarding being effective to cause the WLAN AP to change the transmit power of the WLAN AP.

12. A method to monitor and manage a wireless local area network (WLAN) access point (AP) in a WLAN network by a WLAN gateway of a cellular network, the method comprising:
   receiving, by the WLAN gateway, a control-plane request from a core network function to report one or more parameters of the WLAN AP to the core network function, the one or more parameters of the WLAN AP including a current transmit bandwidth of the WLAN AP;
   forwarding the control-plane request to the WLAN AP, the forwarding being effective to cause the WLAN AP to respond to the control-plane request;
   receiving a response to the control-plane request from the WLAN AP the response including the current transmit bandwidth of the WLAN AP;
   forwarding the response from the WLAN AP to the core network function;
   receiving, by the WLAN gateway, another control-plane request from the core network function to command the WLAN AP to change a transmit bandwidth of the WLAN AP; and
   forwarding the command to the WLAN AP, the forwarding being effective to cause the WLAN AP to change the transmit bandwidth of the WLAN AP.

13. A method to monitor and manage a wireless local area network (WLAN) access point (AP) in a WLAN network by a WLAN gateway of a cellular network, the method comprising:
   receiving, by the WLAN gateway, a control-plane request from a core network function to report one or more parameters of the WLAN AP to the core network function, the one or more parameters of the WLAN AP including a current AP identity of the WLAN AP;
   forwarding the control-plane request to the WLAN AP, the forwarding being effective to cause the WLAN AP to respond to the control-plane request;
   receiving a response to the control-plane request from the WLAN AP the response including the current AP identity of the WLAN AP;
   forwarding the response from the WLAN AP to the core network function;
   receiving, by the WLAN gateway, another control-plane request from the core network function to command the WLAN AP to change an AP Service Set Identifier (SSID) of the WLAN AP; and
   forwarding the command to the WLAN AP, the forwarding being effective to cause the WLAN AP to change the AP SSID of the WLAN AP.

14. A WLAN gateway device in a cellular network comprising:
   a core network interface; and
   a processor and memory system to implement a WLAN gateway manager application configured to:

receive a control-plane request from a core network function to report one or more parameters of a wireless local area network (WLAN) access point (AP) in a WLAN network to the core network function, the one or more parameters of the WLAN AP including a current transmit power of the WLAN AP;

forward the control-plane request to the WLAN AP that is effective to cause the WLAN AP to respond to the control-plane request;

receive a response to the control-plane request from the WLAN AP the response including the current transmit power of the WLAN AP;

forward the response from the WLAN AP to the core network function;

receive another control-plane request from the core network function to command the WLAN AP to change a transmit power of the WLAN AP; and forward the command to the WLAN AP, the forwarding being effective to cause the WLAN AP to change the transmit power of the WLAN AP.

15. A WLAN gateway device in a cellular network comprising:

a core network interface; and a processor and memory system to implement a WLAN gateway manager application configured to:

receive a control-plane request from a core network function to report one or more parameters of a wireless local area network (WLAN) access point (AP) in a WLAN network to the core network function, the one or more parameters of the WLAN AP including a current transmit bandwidth of the WLAN AP;

forward the control-plane request to the WLAN AP that is effective to cause the WLAN AP to respond to the control-plane request;

receive a response to the control-plane request from the WLAN AP the response including the current transmit bandwidth of the WLAN AP;

forward the response from the WLAN AP to the core network function;

receive another control-plane request from the core network function to command the WLAN AP to change a transmit bandwidth of the WLAN AP; and forward the command to the WLAN AP, the forwarding being effective to cause the WLAN AP to change the transmit bandwidth of the WLAN AP.

16. A WLAN gateway device in a cellular network comprising:

a core network interface; and a processor and memory system to implement a WLAN gateway manager application configured to:

receive a control-plane request from a core network function to report one or more parameters of a wireless local area network (WLAN) access point (AP) in a WLAN network to the core network function, the one or more parameters of the WLAN AP including a current AP identity of the WLAN AP;

forward the control-plane request to the WLAN AP that is effective to cause the WLAN AP to respond to the control-plane request;

receive a response to the control-plane request from the WLAN AP the response including the current AP identity of the WLAN AP;

forward the response from the WLAN AP to the core network function;

receive another control-plane request from the core network function to command the WLAN AP to change an AP Service Set Identifier (SSID) of the WLAN AP; and forward the command to the WLAN AP, the forwarding being effective to cause the WLAN AP to change the AP SSID of the WLAN AP.

17. A system comprising:

a wireless local area network (WLAN) access gateway; and a mobility management function connected to the WLAN access gateway by a first interface; and the WLAN access gateway configured to:

receive, from the mobility management function and via the first interface, a control-plane request to report one or more parameters of a WLAN access point (AP) in a WLAN network, the one or more parameters of the WLAN AP including a current transmit power of the WLAN AP;

forward the control-plane request to the WLAN AP that is effective to cause the WLAN AP to respond to the control-plane request;

receive a response to the control-plane request from the WLAN AP the response including the current transmit power of the WLAN AP;

forward, to the mobility management function and via the first interface, the response from the WLAN AP;

receive another control-plane request from the mobility management function to command the WLAN AP to change a transmit power of the WLAN AP; and forward the command to the WLAN AP, the forwarding being effective to cause the WLAN AP to change the transmit power of the WLAN AP.

18. A system comprising:

a wireless local area network (WLAN) access gateway; and a mobility management function connected to the WLAN access gateway by a first interface; and the WLAN access gateway configured to:

receive, from the mobility management function and via the first interface, a control-plane request to report one or more parameters of a WLAN access point (AP) in a WLAN network, the one or more parameters of the WLAN AP including a current transmit bandwidth of the WLAN AP;

forward the control-plane request to the WLAN AP that is effective to cause the WLAN AP to respond to the control-plane request;

receive a response to the control-plane request from the WLAN AP the response including the current transmit bandwidth of the WLAN AP;

forward, to the mobility management function and via the first interface, the response from the WLAN AP;

receive another control-plane request from the mobility management function to command the WLAN AP to change a transmit bandwidth of the WLAN AP; and forward the command to the WLAN AP, the forwarding being effective to cause the WLAN AP to change the transmit bandwidth of the WLAN AP.

19. A system comprising:

a wireless local area network (WLAN) access gateway; and a mobility management function connected to the WLAN access gateway by a first interface; and the WLAN access gateway configured to:

receive, from the mobility management function and via the first interface, a control-plane request to report one or more parameters of a WLAN access point (AP) in a WLAN network, the one or more parameters of the WLAN AP including a current AP identity of the WLAN AP;

forward the control-plane request to the WLAN AP that is effective to cause the WLAN AP to respond to the control-plane request;

receive a response to the control-plane request from the WLAN AP the response including the current AP identity of the WLAN AP;

forward, to the mobility management function and via the first interface, the response from the WLAN AP;

receive another control-plane request from the mobility management function to command the WLAN AP to change an AP Service Set Identifier (SSID) of the WLAN AP; and forward the command to the WLAN AP, the forwarding being effective to cause the WLAN AP to change the AP SSID of the WLAN AP.

* * * * *